R. L. CAMPBELL.
PUMP.
APPLICATION FILED MAR. 28, 1914.

1,130,959.

Patented Mar. 9, 1915.
3 SHEETS—SHEET 1.

Witnesses

Inventor
R. L. Campbell
By
Attorneys

R. L. CAMPBELL.
PUMP.
APPLICATION FILED MAR. 28, 1914.

1,130,959.

Patented Mar. 9, 1915.
3 SHEETS—SHEET 2.

Inventor
R. L. Campbell

Witnesses

By
Attorneys

R. L. CAMPBELL.
PUMP.
APPLICATION FILED MAR. 28, 1914.

1,130,959.

Patented Mar. 9, 1915.
3 SHEETS—SHEET 3.

Inventor
R. L. Campbell

Witnesses

By
Attorneys

UNITED STATES PATENT OFFICE.

ROSS LYON CAMPBELL, OF WILMINGTON, DELAWARE.

PUMP.

1,130,959.  Specification of Letters Patent.  Patented Mar. 9, 1915.

Application filed March 28, 1914. Serial No. 827,995.

*To all whom it may concern:*

Be it known that I, Ross LYON CAMPBELL, a citizen of the United States, residing at Wilmington, in the county of New Castle and State of Delaware, have invented new and useful Improvements in Pumps, of which the following is a specification.

This invention relates to pumps, particularly to pumps for compressing air and other gaseous fluids, and has for its object to provide a simple and highly efficient pump of small size and light weight, comprising few parts which may be economically maunfactured, and which is fitted with a simple valve system for controlling the flow of fluid, the whole forming a structure that can be easily and smoothly driven at high speed.

The pump has two or more cylinders arranged in pairs in line with each other, the pistons of which pairs of cylinders are rigidly connected together and move in unison and serve as guides one for the other, said pistons being without packing rings or packing of any kind that contact with the walls of the cylinders and require lubrication, the pistons being made tight by a stuffing box in the end of each cylinder through which the pistons pass. It will be seen that the air or other fluid which is to be compressed is maintained free from contact with any lubricant. Thus the pump is especially well adapted for the purpose of inflating rubber tires, such as automobile tires, as it is highly desirable to prevent oil or grease in any form from coming into contact with the tires as the same is readily acted upon and deteriorated thereby. The pistons are reciprocated by an eccentric runing in contact with the inner end of each piston of a pair, the pistons themselves being made hollow to contain a lubricant and are open at their inner ends -to permit said lubricant reaching the eccentric. The lubricant contained in the hollow pistons is preferably of a viscous nature, such as a heavy grease and is to be fed through the openings in the ends of the hollow pistons by the movement of the latter. The lubricant is substantially confined to the working face of the eccentric and the inner ends of the pistons upon which the eccentric acts, and is not applied to the outer walls of the pistons which work within the cylinders and thereby the packing about the pistons is prevented from becoming saturated with the lubricant.

Figure 1:
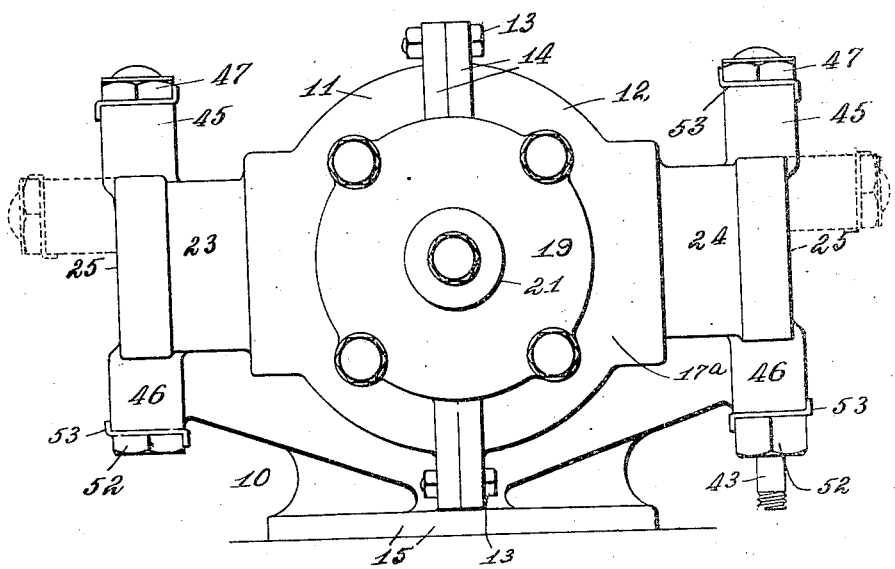
Figure 2:
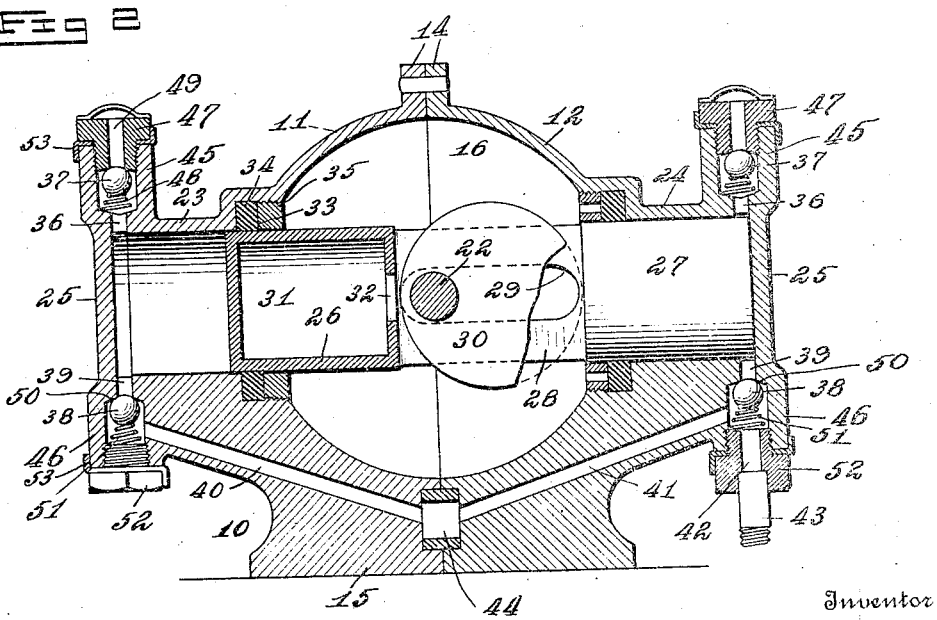
Figure 3:
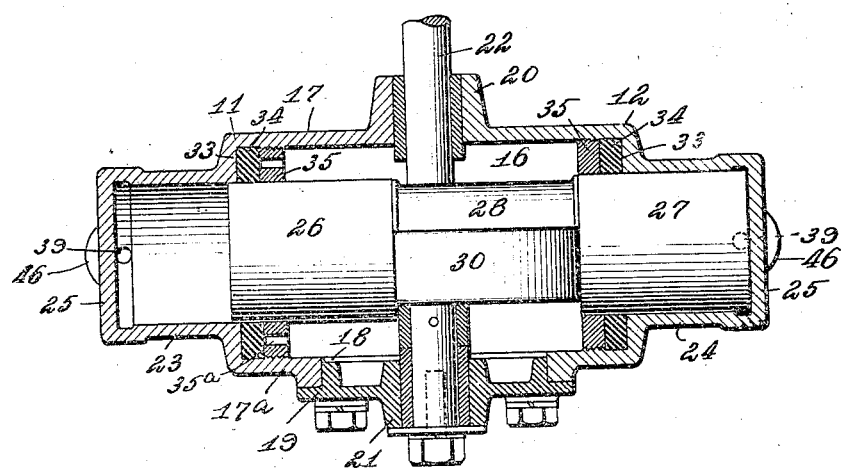

These and other features of the invention which form the subject of the present invention will now be described in detail in connection with the accompanying drawings, in which, Figure 1 is a side elevation of the complete pump in one of its forms; Fig. 2 a vertical longitudinal section of the same; Fig. 3 a central horizontal sectional view; and Fig. 4 a vertical transverse sectional view; Fig. 5 is a side elevation partly in section of the preferred form of pump; Fig. 6 is a central transverse sectional view of Fig. 5.

Figure 4:
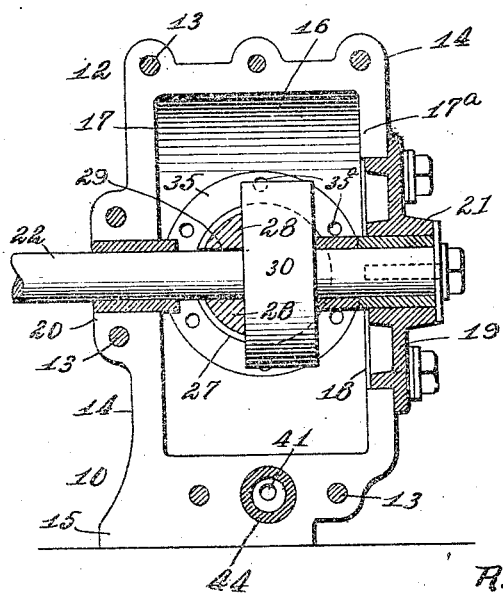
Figure 5:
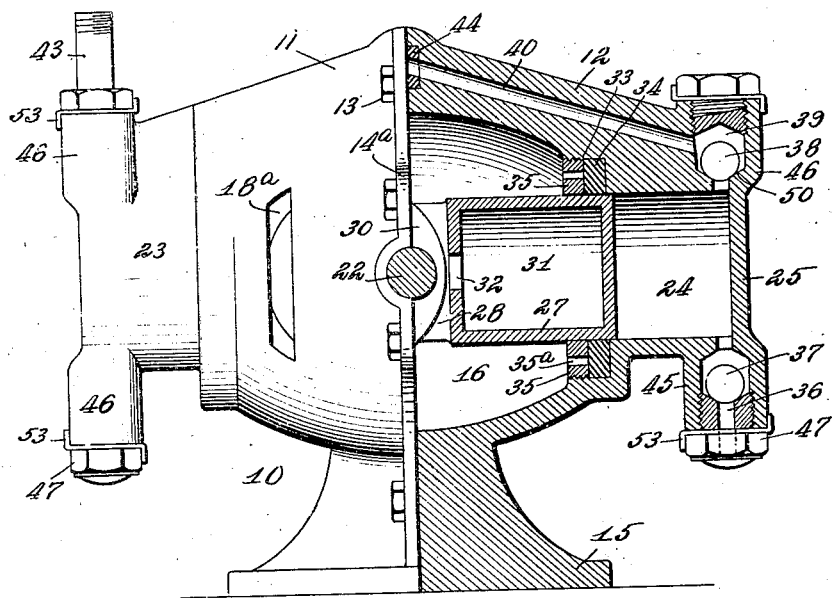
Figure 6:
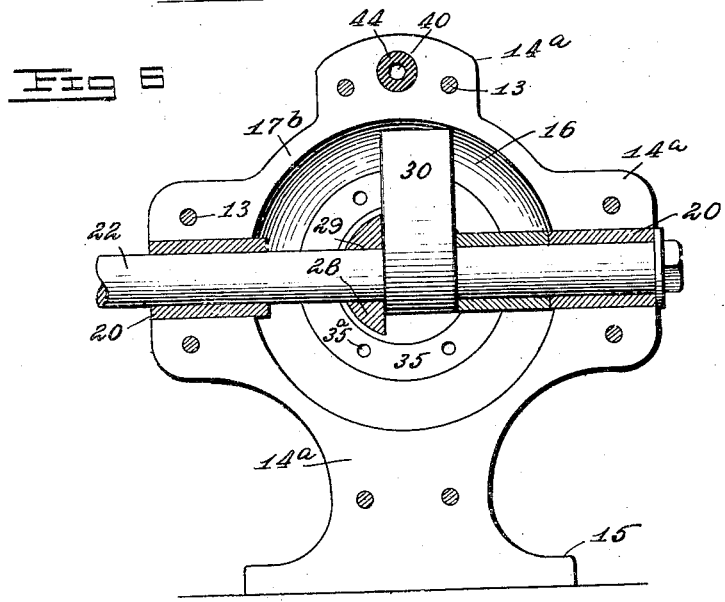

In the drawings, 10 designates the frame of the pump made in two parts 11 and 12 connected together in a transverse central plane by bolts 13 passing through a flange 14 extending around each of said parts, as in Figs. 1, 2 and 4; or through projecting angle plates 14$^a$, as in Figs. 5 and 6, the contacting faces of which parts fit snugly one against the other. The two parts 11 and 12, Figs. 1 to 4, are similar but made right and left; in Figs. 5 and 6 the two parts are duplicates and require only one pattern and one set of tools to machine both parts. The pump is supported upon a pedestal 15 integral with the two parts 11 and 12 of the pump cylinder. Within the center of the frame 10 is a chamber 16 which is closed on one side, as in Figs. 1 to 4, by a straight vertical wall 17 cast integral with the two parts 11, 12, of the frame, and on the opposite side by a like wall 17$^a$, through which is made a circular opening 18 closed by a plate 19 bolted to the frame. An optional and preferred construction is shown in Figs. 5 and 6 where the two side walls 17$^b$ are alike and instead of being vertical they curve outwardly. In one side of each wall there is a small slotted opening 18$^a$, the object of which will be set forth later. The wall 17 and plate 19 are provided respectively with bearings 20, 21 for a rotatable shaft 22, the bearing 20 being in two parts each of which is integral with one of the parts 11, 12 of the frame. In Figs. 5 and 6 each wall 17$^b$ is provided with a divided bearing 20.

The pump cylinders 23, 24, are here shown as horizontally disposed in line with each other on opposite sides of the shaft 22. Each cylinder is cast integral with one of the frame parts 10, 11, and opens at its inner end into the chamber 16. The outer ends of the cylinders are permanently closed by heads 25 cast with the cylinders. The number of cylinders may be increased if desired to any multiple and arranged either parallel or at right angles to each other.

Within the cylinders 23, 24, are pistons 26, 27, connected together at their inner ends by a bar or plate 28 offset or placed at one side of the center as shown in Figs. 3 and 4. Through the center of said plate or bar is a horizontal slot 29 to accommodate the shaft 22 and allow the pistons to reciprocate longitudinally within the cylinders.

Fixed on the shaft 22 between the pistons is an eccentric 30 of such diameter as to bear at all times upon the inner ends of the pistons 26, 27, and as said eccentric rotates, to positively reciprocate the pistons to and fro in the cylinders. Each piston is made hollow, the cavity 31 therein containing a lubricant for the eccentric that escapes from the cavity onto the eccentric through an opening 32 in the inner end of the piston.

The eccentric is placed between the inner ends of the pistons so that it is in line with the openings 32 in the same. Thus, as the eccentric is rotated, it partially closes at all times the openings 32 and at the end of both the outward and inward strokes of the pistons, portions of the periphery of the eccentric bear immediately over the openings so that the same is substantially closed.

The pistons fit snugly within the cylinders but are not fluid tight therein, and therefore do not require packing rings. They are, however, made tight where they enter the cylinders by a stuffing box 33 containing a self-lubricating mineralite packing 34 held against the piston by a threaded collar 35, in the side of which are several holes 35ª for a spanner whenever it is found necessary to turn the collar to adjust the bearings. In the form of pump shown in Figs. 1 to 4, the plate 19 is removed when the collar is to be turned, but in the pump of Figs. 5 and 6, no removal of bolts is necessary, the spanner is passed into the slotted opening 18ª to engage the holes in the collar 35.

Air or other fluid enters the cylinders through ports 36 guarded preferably by ball valves 37 carried in hollow casings 45 projecting from the outer end of each cylinder, and, for convenience of manufacture, at right angles to the axis of said cylinders. If desired, these casings may lie parallel to the axis of the cylinders as in dotted lines Fig. 1. Similar valves 38, carried in casings 46 in line with the casings 45 of the inlet valves, control outlet ports 39 connected to passages 40, 41, that extend from said outlet portions inwardly through the frame to the connecting faces of the parts 11, 12, thereof, where they communicate with each other. The joined ends of the passages 40, 41, are enlarged to receive a packing ring 44 that prevents the escape of fluid at the connection between the frame parts 11 and 12. The passages 40, 41, and the exhaust valves 38 may be on the under side of the pump, if desired, as in Figs. 1 to 4, but preferably they are placed at the top thereof, as in Figs. 5 and 6.

The casing 45 of each inlet valve is interiorly threaded at its outer end for a cap 47 screwed thereinto, the inner ends of which caps are provided with seats for the ball valves 37 held thereagainst by springs 48, when on the top of the pump, and by gravity when at the bottom. A perforation 49 extends outwardly from each seat for the inflowing fluid. The exhaust valves 38 are held against seats 50 in the pump frame 10 at the outer ends of the exhaust ports 39 by springs 51 supported on plugs 52 screwed into the outer ends of the stems 46, or by gravity, as the valves are placed below or above the pump. The caps 47 and plugs 52 are prevented from turning by locking means 53 of any approved form. One of the plugs 52 has a passage 42 therethrough into the outer end of which a stem 43 is screwed to provide means for attaching a flexible tube or other pipe to convey the fluid wherever desired.

A pump as above described may be employed to compress air and gas for various uses, one such use which may be mentioned is to fill the tires of automobiles, and when so used the pump is mounted on the automobile in position to be operated by friction or other driving means from the engine, and when so connected the shaft 22 rotates three hundred to four hundred revolutions per minute. At this high speed the temperature of the compressed air rises rapidly and heats the pump to a temperature between two hundred and fifty to three hundred degrees. Under this condition, oil or grease if used for lubricating the pistons will be volatilized by the heat and the oil vapor carried with the air into the tires causes rapid destruction of the inner tubes. It is for this reason that no packing requiring lubrication is carried by the piston. The packing rings 34 in the stuffing boxes are made of a mineral substance containing graphite and do not volatilize.

During the operation of the pump the eccentric is caused to rotate between the inner ends of the pistons so as to reciprocate the latter, and the openings in the ends of the pistons are so positioned as to be in line with the eccentric at all times. During the stroke of the pistons in one direction the lubricant in that piston which is moving outwardly or away from the center of rotation of the eccentric is forced against the inner wall of the piston and into the opening 32, while in the other piston which is moving toward the center of rotation of the eccentric the lubricant is forced backwardly, or toward the head of the same. On the reverse stroke the lubricant is forced by its inertia in the opposite direction. The lubricant is preferably of a viscous nature, a very heavy grease being most desirable. The tendency of the lubricant to be thrown toward the opposite ends of the pistons as they reciprocate serves to carry it toward and from the eccentric so as to lubricate the same. As the eccentric bears against the inner ends of the pistons at all times, and in line with the openings, the latter are partially closed or obstructed by the periphery of the eccentric, and especially is this true when the pistons are at either end of their strokes when the openings are substantially closed by the eccentric. When the pistons change their motion the lubricant in the piston which is moving away from the center of rotation of the eccentric is forced into the opening at the inner wall or end of the same, but as the eccentric at this time substantially closes the opening the lubricant in the piston is banked up against the eccentric and is prevented from escaping into the central chamber of the pump. The eccentric during its rotative movement wipes off or gathers upon its periphery a sufficient supply of lubricant not only for the eccentric, but also for the inner walls of the pistons in contact therewith. Thus it will be noted that while the required parts are properly lubricated, the outer surfaces of the pistons which work within the cylinders are substantially maintained free from the lubricant, and a use of light oil which would tend to splash upon the pistons when they are withdrawn from the cylinders, and which is easily volatilized is avoided.

The frame of the pump is very simple and easily finished and assembled, consisting as it does of the two like parts 11 and 12 bolted together, upon each of which parts is integrally formed a cylinder that communicates with a central chamber into which the inner ends of the pistons project and through which travels the bar connecting said pistons. This chamber also contains the operating eccentric and the shaft carrying the same, the ends of which shaft turn in bearings on the frame. One or both of the bearings is or are divided and each half is integral with each frame part, the other bearing when only one is divided, projects from a plate bolted over the open side of said chamber. The inlet and exhaust valve casings are also integral with the frame parts 11, 12, and by arranging them in line with each other perpendicular to the axis of the pump cylinder they are in position to be easily bored out, ground and threaded during the operation of finishing the parts.

What I claim is,—

1. In a pump, a hollow piston adapted to contain a lubricant and having an opening in its walls, and an operating member for reciprocating the piston, said operating member being adapted to engage the wall of the piston at the opening therein whereby to contact with the lubricant as the latter by its inertia is forced into the opening upon the outward movement of the piston.

2. In a pump, the combination with a plurality of cylinders open at their inner ends, a shaft and an eccentric fixed on the shaft, of a hollow piston movable in each of said cylinders adapted to contain a lubricant and having an inner end wall with an aperture therethrough, said eccentric being in operative contact with each of said inner end walls of the pistons in line with the apertures, said pistons upon the movement of the same being adapted to force the lubricant by its inertia against said end walls of the pistons and into said apertures therethrough whereby to present the lubricant to said eccentric as the latter passes over the apertures.

3. In a pump, the combination with a plurality of cylinders open at their inner ends, a shaft, and an eccentric fixed on the shaft, of a hollow piston movable in each of said cylinders adapted to contain a lubricant and having an inner end wall with an aperture therethrough, said pistons upon the movement of the same being adapted to force the lubricant by its inertia against said inner walls and into the apertures therein, said eccentric being in line with the apertures whereby the periphery of the same is in constant operative contact with each of said inner end walls of the pistons adjacent the apertures therein whereby to partially choke the apertures and prevent the ejection of an excess amount of lubricant and whereby the periphery of said eccentric is adapted to contact with the lubricant and to collect the same thereon.

4. In a pump, the combination with a plurality of opposed cylinders, a shaft, and an eccentric fixed on said shaft, of a plurality of connected hollow pistons movable in said cylinders, said eccentric bearing at its periphery against the opposite inner ends of said pistons whereby to reciprocate the same, said pistons being adapted to contain a lubricant therein and having openings at their inner ends adapted to be substantially closed by said eccentric at the end of a stroke of the pistons, said pistons upon their outward strokes being adapted to force the lubricant by its inertia through the openings against the periphery of the eccentric.

5. In a pump, a piston, a chamber within the piston adapted to contain a lubricant and having an outlet through the wall of the piston, a shaft, and operating means comprising an eccentric for reciprocating the piston, said eccentric being adapted to engage the wall of the piston at the outlet therein whereby to contact with the lubricant as the latter by its inertia is thrown against said end wall and into the outlet upon the outward movement of the piston.

6. In a pump, a hollow piston adapted to contain a lubricant and having an opening in its end spaced from the lower wall of said piston, and operating means for reciprocating said piston, said piston upon the movement of the same being adapted to feed the lubricant by its inertia through the opening and onto said operating means.

7. In a pump, a piston, a chamber within the piston adapted to contain a lubricant and having an outlet in its end spaced from the lower wall of said piston, a shaft, and operating means comprising an eccentric for reciprocating the piston, said eccentric being adapted to engage the wall of the piston at the outlet therein whereby to contact with the lubricant as the latter by its inertia is thrown against said end wall and into the outlet upon the outward movement of the piston.

In testimony whereof I have hereunto set my hand in presence of two subscribing witnesses.

ROSS LYON CAMPBELL.

Witnesses:
J. T. RIDGWAY,
HARRY SCHAURER.